No. 679,813. Patented Aug. 6, 1901.
J. L. WOODBRIDGE.
MEANS FOR REGULATING DOUBLE CURRENT DYNAMO ELECTRIC MACHINES.
(Application filed Apr. 30, 1901.)
(No Model.)
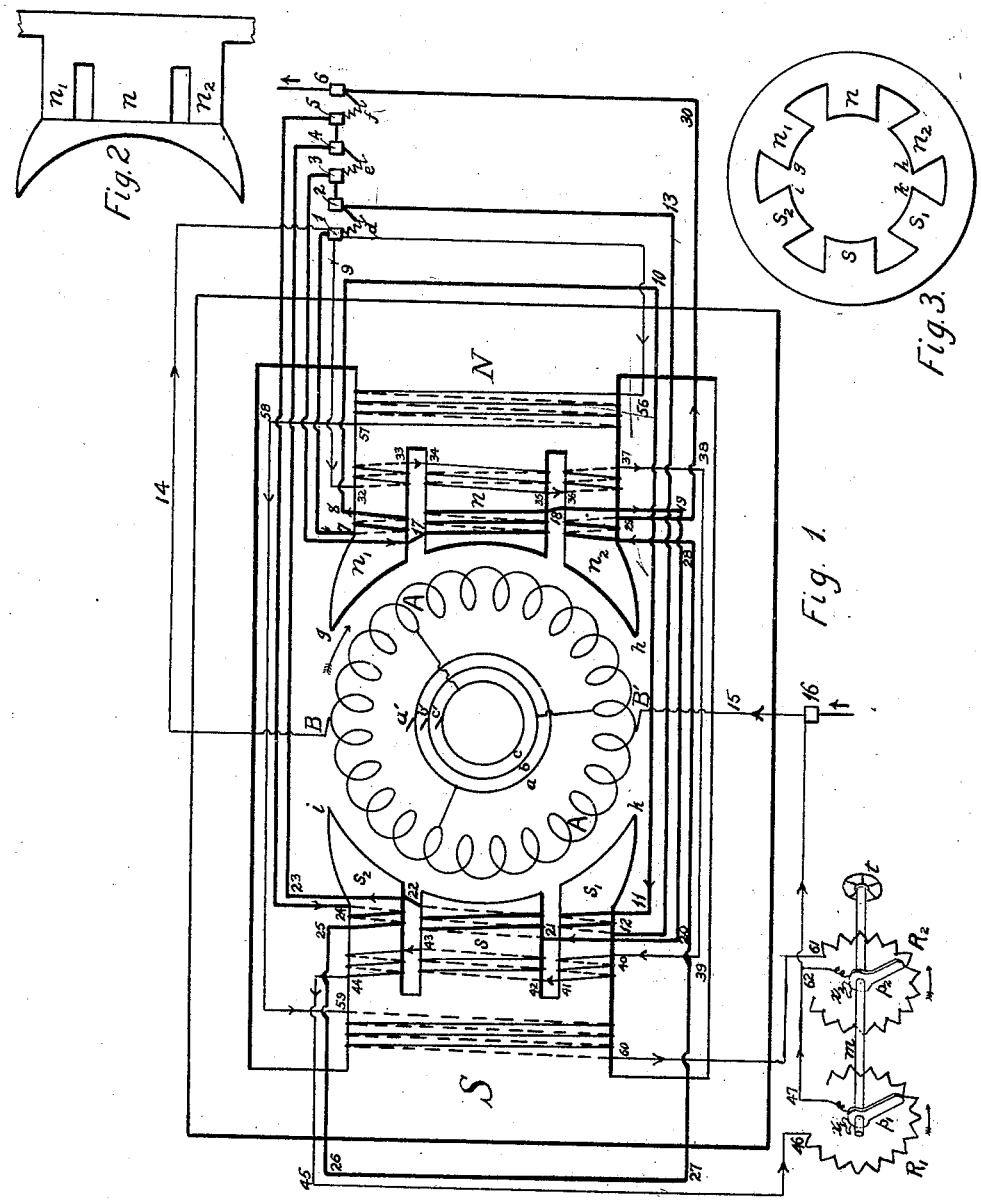
WITNESSES:
J. Lester Woodbridge
INVENTOR

UNITED STATES PATENT OFFICE.

JOSEPH LESTER WOODBRIDGE, OF PHILADELPHIA, PENNSYLVANIA.

MEANS FOR REGULATING DOUBLE-CURRENT DYNAMO-ELECTRIC MACHINES.

SPECIFICATION forming part of Letters Patent No. 679,813, dated August 6, 1901.

Application filed April 30, 1901. Serial No. 58,195. (No model.)

*To all whom it may concern:*

Be it known that I, JOSEPH LESTER WOODBRIDGE, a citizen of the United States, residing in the city of Philadelphia, in the county of Philadelphia, State of Pennsylvania, have invented certain new and useful Improvements in the Means for Regulating Double-Current Dynamo-Electric Machines, of which the following is a specification.

My invention relates to those dynamo-electric machines which are designed to develop or utilize both direct and alternating currents in one and the same armature-winding, and under the title "double-current dynamo-electric machines," which I have used throughout this specification and claims, I intend to include any dynamo-electric machine provided with both a commutator and collector-rings connected to the same armature-winding, whether the machine, first, is driven by some external source of power and delivers both alternating and direct currents, or, second, receives direct currents and delivers alternating currents, or, third, receives alternating currents and delivers direct currents. The first case is that of the double-current generator, and the second and third cases are rotary converters. My invention is equally applicable to all three, and in using the phrase "double-current dynamo-electric machine" I intend to include them all. Also in referring to the electromotive force, whether alternating or direct, generated in the armature of such a machine I intend to include not only such electromotive forces as are codirectional with the current, involving the function of generator, but also such as are counter to the current or to some applied electromotive force, involving the function of motor.

It is the object of my invention to provide an improved means for controlling and varying the relation between the alternating and the direct current electromotive force developed in the armature of a double-current dynamo-electric machine. Up to the present time very little, if any, modification has been possible in the relation between these two electromotive forces. In the double-current generator they must rise or fall together with any variation of speed or field excitation. In a rotary converter receiving direct currents at constant voltage if any attempt is made to increase the alternating electromotive force by strengthening the fields the only effect will be to reduce the speed of rotation, the alternating voltage remaining the same. If the rotary is receiving alternating currents at constant electromotive force and delivering direct currents, the usual method of controlling the direct-current voltage, particularly where it is to be done automatically, consists in altering the field excitation; but such an alteration will still change both the direct-current voltage and the alternating counter electromotive force together, and for conditions of equilibrium will necessarily be accompanied by a change of phase relation between the applied and the counter alternating electromotive force unless the former is also changed. Ordinarily this change in phase relation is brought about more or less gradually by a temporary change in armature speed, the armature running ahead of or falling behind its former phase position, according as the excitation is diminished or increased, until it reaches its new position of equilibrium. Because of the inertia of the armature this method of regulation is sluggish in its action and introduces excessive fluctuations of current in the alternating supply-lines and produces a tendency in the armature to seesaw and be thrown wholly out of step. The equilibrium is not reëstablished until the phase position of the armature is altered sufficiently to introduce into the alternating supply-lines wattless currents of such magnitude in many cases as to cause exceedingly objectionable effects on the heating, efficiency, and regulation of the alternating-current apparatus and transmission-lines, as well as on the steadiness of armature speeds.

Now it is the object of my invention to provide improved means for regulating the ratio between the alternating and the direct current voltage developed by a double-current dynamo-electric machine which shall permit a comparatively wide variation of that ratio without introducing objectionable wattless currents into the alternating circuits or causing the other objectionable results above mentioned. While it is known that on account of the difficulties above cited no appreciable variation in the relation between the alternating and the direct current voltage developed by a double-current dynamo-electric machine as heretofore constructed can be effected practically and that in the case of a rotary receiving alternating currents and delivering direct currents when a considerable variation in the direct-current voltage is desired, it has been found necessary to alter the alternating voltage simultaneously either by some method of hand regulation or automatically by means of the inductive effects of the wattless currents above referred to in the alternating circuits, yet it is also known that in two differently-constructed double-current machines the ratio of the alternating to the direct current voltage may be markedly different on account of the difference in the relative breadth of the pole-faces and the resulting difference in the distribution of the lines of magnetic force and in the shape of the wave of alternating electromotive force. For example, two rotaries each of the same number of phases and subjected to the same alternating electromotive force may be constructed to give quite different direct-current electromotive forces without in either case introducing objectionable wattless currents into the alternating circuits by proportioning the pole-pieces differently in each case.

Now it is the object of my invention to provide means for varying and controlling the relation between the alternating and the direct current electromotive forces of a double-current dynamo-electric machine over a comparatively wide range by altering the relative distribution of the lines of magnetic force over the pole-face, and thus changing the shape of the wave of alternating electromotive force. Thus by concentrating the lines of force near the middle of the pole-face they will become more effective in producing alternating voltage and the ratio of alternating to direct current electromotive force may be thus increased, the latter electromotive force being dependent not upon the distribution of the lines of force, but upon the total number of such lines. Conversely, if the lines of force are spread over a broad pole-face or concentrated near its tips they become less effective in producing alternating electromotive force (the lines of opposite polarity from two adjacent pole-faces counteracting each other when included within the same phase section of the armature-winding) and the ratio of alternating to direct current electromotive force will be reduced.

In the accompanying drawings, Figure 1 illustrates the general scope of my invention, and Figs. 2 and 3 show modifications thereof.

In Fig. 1, A A represent the armature-winding of a three-phase double-current dynamo-electric machine, the armature being supposed to rotate in the direction shown by the arrow.

B and B' are respectively the positive and negative direct-current brushes, shown for simplicity as bearing directly upon the armature-winding, but which will of course be understood to bear upon a commutator connected therewith in actual practice. These brushes are shown connected by circuits 14 and 15 to the terminals 1 and 16, respectively.

$a$, $b$, and $c$ are collector-rings which are connected to the armature-winding at three equidistant points and upon which bear the brushes $a'$, $b'$, and $c'$, which constitute the alternating-current terminals of the machine.

N and S are the north and south poles, respectively, and are each divided into three separate horns or paths for the magnetic flux $n\ n'\ n^2$ and $s,\ s'$, and $s^2$. The divisions between these magnetic paths may extend entirely through to the pole-face, as shown in Fig. 1, or may be bridged over at the pole-face, as shown in Fig. 2, or these divisions may extend to the yoke or frame of the machine, as in Fig. 3, giving these magnetic paths the appearance of separate poles. It will be observed, however, that in the construction shown in Fig. 3 $n$, $n'$, and $n^2$ will be of like polarity and constitute one pole, the same as in Figs. 1 and 2. On the leading horns $n'$ and $s'$ in Fig. 1 are shown series windings 1 7 8 9 10 11 12 13 2. On the middle horns $n$ and $s$ are shown series windings 3 17 18 19 20 21 22 23 4. On the trailing horns $n^2$ and $s^2$ are shown series windings 5 24 25 26 27 28 29 30 6. By means of the connections shown between terminals 2 and 3 and between 4 and 5 these three sets of windings are connected in series with each other and with the positive side of the direct-current circuit, terminal 6 constituting the positive terminal of the machine in relation to the external direct-current circuit. The effects of these three sets of windings on the respective pole-horns which they embrace may be modified and adjusted by means of the three adjustable shunts $d$, $e$, and $f$. Assuming that the machine is delivering direct currents at its direct-current terminals, the direction of these currents will be as shown by the arrows, and it will be noted that the effect of these currents in the series windings on the leading and trailing horns of the poles will be to increase the magnetic flux in them, while the current in the series windings on the middle horns will decrease the magnetism therein. It will be seen, therefore, that any increase in the direct-current output of the machine will strengthen the edges of the magnetic field and weaken it in the middle. The effect of this will be to increase the ratio of the direct-current electromotive force to the alternating electromotive force, and if the amount of current in the several windings be properly adjusted by means of the adjustable shunts $d$, $e$, and $f$ any one of several effects may be produced. If the edges of the field are considerably strengthened and the middle weakened to a less extent, the total magnetic flux, and therefore the direct-current voltage, will be increased, while the alternating voltage will remain stationary. This arrangement would be of advantage where the machine is driven by an outside source of power and is delivering both direct and alternating currents, as it permits the compounding or overcompounding at the direct-current terminals without interfering with the regulation of the alternating terminals. If the edges of the fields are still further strengthened and the middle still further weakened, the same rise of direct-current electromotive force may be produced, accompanied by a fall of the alternating electromotive force. This is of special advantage where the machine is operating as a rotary converter and is driven by the alternating currents received at its collector-rings. The fall in alternating electromotive force in the armature may thus be made to correspond with any drop in the alternating lines due to the increased current in them. Still another effect may be secured in the latter case. The increased current in the alternating lines may cause a change in the phase of the applied alternating voltage, making it desirable to shift the phase of the counter electromotive force correspondingly. This may readily be done by adjusting one of the shunts $d$ or $f$ so as to strengthen the leading pole-horns to a greater extent than the trailing horns, or vice versa, according to the direction in which it is desired to shift the phase of the alternating counter electromotive force. Similarly by strengthening the excitation of one side of the fields more than the other the distorting effects of armature reaction on the fields may be counteracted.

In addition to the above-described series windings I have shown on the diagram two shunt-windings. One of these, 1 56 57 58 59 60 61, is the principal shunt-winding, embracing the north and south poles (N and S) in their entirety, as in the ordinary type of generator or motor, the current therein being regulated by means of the rheostat $R^2$, included in the circuit. The other or auxiliary shunt-winding 1 32 33 34 35 36 37 38 39 40 41 42 43 44 45 46 is wound on the several pole-horns $n$ $n'$ $n^2$ $s$ $s'$ $s^2$ separately and the current therein is controlled by the rheostat $R'$. It will be noted that those parts of this latter winding 34 35 and 42 43 which embrace the middle horns $n$ and $s$ are wound in the opposite direction from those parts which embrace the outer horns $n'$ $n^2$ $s'$ $s^2$. Current in this winding flowing in the direction shown by the arrows will therefore increase the magnetism in the outer horns and decrease that in the middle horns. If the amount of this increase produced in each of the outer horns is equal to the amount of decrease in each of the middle horns, then the effect will be to increase the direct-current electromotive force without altering the alternating electromotive force, and this effect may be regulated by the rheostat $R'$. The two arms $p'$ and $p^2$ of the rheostats $R'$ and $R^2$ are carried on the same spindle $m$, operated by the hand-wheel $t$, and may be attached to or released from this spindle by tightening or loosening the thumbscrews $x'$ and $x^2$, and thus either rheostat may be operated independently of the other or both may be operated simultaneously. These two rheostats are so connected that motion of the arm $p^2$ in the direction shown by the arrow will increase the current in the principal shunt-winding, thus increasing both the direct-current and alternating-current electromotive force, while motion of the arm $p'$ in the same direction will decrease the current in the auxiliary winding, thus decreasing the direct-current electromotive force without altering the alternating electromotive force. If the rheostats are so designed that the increase in the direct-current electromotive force due to a movement of the arm $p^2$ is equal to the decrease in this electromotive force due to the same angular movement of $p'$, these two effects will neutralize each other and the simultaneous motion of the two arms $p'$ and $p^2$ will have no effect on the direct-current electromotive force, but will alter the alternating-current electromotive force. Thus by changing the position of $p'$ we can vary the direct-current electromotive force without altering the alternating-current electromotive force. By moving $p'$ and $p^2$ together we can vary the alternating-current electromotive force without altering the direct-current electromotive force, and by moving $p^2$ only we can alter both electromotive forces simultaneously, the total amount of magnetic flux being varied without altering its distribution over the pole-face.

In speaking of the pole-face it will be understood that I refer to the whole area between the pole-tips $g$ $h$ or $i$ $k$ and not simply to one of the portions into which this surface may be divided by the divisions referred to. It will also be understood that my invention applies to double-current machines having any number of poles and designed to utilize or develop alternating currents of any number of phases. Nor do I confine myself to any particular means for altering the distribution of the magnetic flux over the pole-face nor to any particular means for doing this automatically. I have described an arrangement for varying this distribution automatically with variations of the direct-current output or intake; but a similar automatic regulation of this distribution could be made to accompany changes in the alternating-current intake or output by causing the currents in the series or auxiliary shunt-windings to vary with said intake or output by any of the means well known to those familiar with the present state of the art.

It will be obvious to those skilled in the art to which the invention relates that modifications may be made in details without departing from the spirit thereof. Hence I do not limit myself to the precise construction and arrangement of parts hereinabove set forth, and illustrated in the drawings; but,

Having thus described the nature and objects of the invention, what I claim as new, and desire to secure by Letters Patent, is—

1. In combination, in a double-current dynamo-electric machine, an armature having a single winding connected both to the commutator and to collector-rings and a field-magnet having its poles each divided into three paths for the magnetic flux by divisions in a general direction at right angles to the adjacent direction of armature peripheral motion, and means for varying disproportionately or oppositely the quantity of magnetic flux in each of the three paths, substantially as described.

2. In combination, in a double-current dynamo-electric machine, an armature having a single winding connected both to the commutator and to collector-rings and a field-magnet having its poles each divided into three paths for the magnetic flux by division in a general direction at right angles to the adjacent direction of armature peripheral motion and windings embracing separately these several paths, said windings being so designed and connected that variations in the electric currents flowing through them shall vary disproportionately or oppositely the quantity of magnetic flux in each of the three paths, substantially as described.

3. In combination, in a double-current dynamo-electric machine, an armature having a single winding connected both to the commutator and to collector-rings, and a field-magnet having its poles each divided into three paths for the magnetic flux by divisions in a general direction at right angles to the adjacent direction of armature peripheral motion and windings embracing separately these several paths, and means for so varying the currents in each of said windings as to cause disproportionate or opposite effects on the quantity of magnetic flux in each of the several paths, substantially as described.

4. In combination, in a double-current dynamo-electric machine, an armature having a single winding connected both to the commutator and to collector-rings, and a field-magnet having its poles each divided into three paths for the magnetic flux by division in a general direction at right angles to the adjacent direction of armature peripheral motion, and windings embracing separately these several paths, said windings being connected in series between one of the direct-current brushes of the machine and the main machine terminal of like polarity, said windings being so relatively proportioned and connected that variations in the currents flowing in them shall vary disproportionately or oppositely the quantity of magnetic flux in each of the three paths, substantially as described.

5. In combination, in a double-current dynamo-electric machine, an armature having a single winding connected both to the commutator and to collector-rings, and a field-magnet having its poles each divided into three paths for the magnetic flux by divisions in a general direction at right angles to the adjacent direction of armature peripheral motion, a winding embracing in series the first or leading horns of the several poles, another winding embracing in series the middle horns of the several poles and a third winding embracing in series the last or trailing horns of the several poles, these three windings being connected in series, between one of the direct-current brushes of the machine and the main machine terminal of like polarity and so connected that a flow of current will have a like effect on the quantity of magnetic flux in all the middle horns and the opposite effect on the quantity of magnetic flux in all of the outer (leading and trailing) horns, substantially as described.

6. In combination, in a double-current dynamo-electric machine, an armature having a single winding connected both to the commutator and to collector-rings, and a field-magnet having its poles each divided into three paths for the magnetic flux by divisions in a general direction at right angles to the adjacent direction of armature peripheral motion, a winding embracing in series the first or leading horns of the several poles, another winding embracing in series the middle horns of the several poles and a third winding embracing in series the last or trailing horns of the several poles, these three windings being connected in series, between one of the direct-current brushes of the machine and the main machine terminal of like polarity and so connected that a flow of current will have a like effect on the quantity of magnetic flux in all the middle horns and the opposit effect on the quantity of magnetic flux in all the other (leading and trailing) horns, and adjustable shunts across the terminals of each of the said windings, as and for the purpose described.

7. In combination, in a double-current dynamo-electric machine, an armature having a single winding connected both to the commutator and to collector-rings, a field-magnet having its poles each divided into three paths for the magnetic flux by division in a general direction at right angles to the adjacent direction of armature peripheral motion, a winding consisting of separate coils embracing each of said paths, the coils of the outer (leading and trailing) horns of the poles being wound in the same relative direction and the coils on the middle horns being wound in the opposite direction, and means for varying at will the amount of current in said windings, substantially as described.

8. In combination, in a double-current dynamo-electric machine, an armature having a single winding connected both to the commutator and to collector-rings, a field-magnet having its poles each divided into three paths for the magnetic flux by divisions in a general direction at right angles to the adjacent direction of armature peripheral motion, a principal winding embracing each pole as a whole, an auxiliary winding consisting of separate coils on each of the pole-horns, the coils on the outer (leading and trailing) horns being wound in the same relative direction, and the coils on the middle horns being wound in the opposite direction, and means for varying at will either the current in the principal winding or the current in the auxiliary winding, or the current in both windings simultaneously, substantially as described.

In testimony whereof I have hereunto signed my name.

J. LESTER WOODBRIDGE.

In presence of—
JOHN R. WILLIAMS,
WM. C. DU BOIS.